(12) United States Patent
Choi

(10) Patent No.: US 7,889,288 B2
(45) Date of Patent: Feb. 15, 2011

(54) DUAL REFLECTIVE LIQUID CRYSTAL DISPLAY DEVICE

(75) Inventor: Su-Seok Choi, Gyeonggi-Do (KR)

(73) Assignee: LG Display Co., Ltd., Seoul (KR)

( * ) Notice: Subject to any disclaimer, the term of this patent is extended or adjusted under 35 U.S.C. 154(b) by 663 days.

(21) Appl. No.: 11/012,124

(22) Filed: Dec. 16, 2004

(65) Prior Publication Data

US 2005/0134767 A1     Jun. 23, 2005

(30) Foreign Application Priority Data

Dec. 20, 2003   (KR) .................... 10-2003-0094290

(51) Int. Cl.
  *G02F 1/1335* (2006.01)
(52) U.S. Cl. ..................... 349/61; 349/65; 349/113
(58) Field of Classification Search ............ None
  See application file for complete search history.

(56) References Cited

U.S. PATENT DOCUMENTS

| | | | | |
|---|---|---|---|---|
| 4,158,484 A | * | 6/1979 | Nishiyama | 349/113 |
| 6,064,456 A | * | 5/2000 | Taniguchi et al. | 349/113 |
| 6,295,109 B1 | * | 9/2001 | Kubo et al. | 349/119 |
| 6,347,874 B1 | * | 2/2002 | Boyd et al. | 362/628 |
| 6,897,914 B2 | * | 5/2005 | Yoshida | 349/65 |
| 2003/0063243 A1 | * | 4/2003 | Roosendaal et al. | 349/113 |
| 2003/0174270 A1 | | 9/2003 | Kim | |
| 2003/0210366 A1 | * | 11/2003 | Huang et al. | 349/113 |
| 2005/0046768 A1 | * | 3/2005 | Wu | 349/65 |

FOREIGN PATENT DOCUMENTS

| | | |
|---|---|---|
| CN | 1195118 | 10/1998 |
| CN | 1195119 A | 10/1998 |
| CN | 1438529 A | 8/2003 |
| JP | 2002-357825 | 12/2002 |
| JP | 2003-161945 | 6/2003 |

\* cited by examiner

*Primary Examiner*—David Nelms
*Assistant Examiner*—Lucy P Chien
(74) *Attorney, Agent, or Firm*—McKenna Long & Aldridge LLP

(57) ABSTRACT

A liquid crystal display device includes a first substrate having a first polarizer and a first retardation layer; a second substrate having a second polarizer and a second retardation layer; and a pixel between the first and second substrates, the pixel having a thin film transistor, a first reflective layer on the first substrate, a second reflective layer on the second substrate, a liquid crystal layer between the first and second substrates.

8 Claims, 5 Drawing Sheets

BLACK

WHITE

DUAL REFLECTIVE LIQUID CRYSTAL DISPLAY DEVICE

This application claims the benefit of Korean Patent Application No. 2003-94290, filed on Dec. 20, 2003, which is hereby incorporated by reference for all purposes as if fully set forth herein.

BACKGROUND OF THE INVENTION

1. Field of the Invention

The present invention relates to a reflective liquid crystal display (LCD) device, and more particularly, to a dual-reflective LCD device and a method for fabricating the same that can display the same information at both surfaces thereof.

2. Discussion of the Related Art

A liquid crystal display (LCD) device is one of the most spotlighted display devices, and is being widely used as an image display device applied to various products such as TV monitors, computer monitors, mobile phones, etc. Especially, a reflective LCD device, which may use external light, is used for mobile electronic devices, because it carries a screen with a thin film and consumes less power.

Hereinafter, a structure of a reflective LCD device according to a related art will be explained with reference to FIG. 1.

The reflective LCD device includes a TFT (Thin Film Transistor) array substrate where a thin film transistor (TFT) is formed, and a color filter substrate where a color filter layer is formed. A liquid crystal layer is filled between the TFT array substrate and the color filter substrate. The TFT array substrate includes a transparent substrate 101, a plurality of gate lines (not shown) formed on the substrate, and a plurality of data lines 104 crossing the gate lines, a TFT 150 formed near the crossing region between the gate lines and the data lines 104, a passivation layer 103 formed of an organic layer or an inorganic layer, which protect the TFT, and a reflective layer 105 formed on the passivation layer. The color filter substrate includes a substrate 110, a black matrix 109 formed on the substrate, a color filter layer 108 formed on the substrate, and a common electrode 107 formed on the color filter layer.

The reflective LCD may further include a spacer (not shown) for maintaining a cell gap between the TFT array substrate and the color filter substrate, and an alignment layer (not shown) for an alignment of liquid crystal. A liquid crystal layer 106 having a dielectric constant and a refractive anisotropy is formed between the TFT array substrate and the color filter substrate. The TFT array substrate and the color filter substrate are assembled to each other by a sealant (not shown) formed at a peripheral portion of the display region, thereby forming a reflective LCD panel.

When external light is irradiated on the reflective LCD device, the external light passes through the upper color filter substrate and the liquid crystal layer 106, and then is reflected by the reflection layer 105 formed on the TFT array substrate.

However, in the reflective LCD device, since images are displayed only on one surface of the LCD device, users can not view the images from the opposite direction. To solve this disadvantage of the reflective LCD device, a method is proposed in which a reflective LCD device has two LCD panels bonded together. However, because such a reflective LCD device has two LCD panels, the structure becomes complicated and the production cost increases.

SUMMARY OF THE INVENTION

Accordingly, the present invention is directed to a dual-reflective liquid crystal display device that substantially obviate one or more of the problems due to limitations and disadvantages of the related art.

An advantage of the present invention is to provide a dual-reflective LCD device that can display the same information at both surfaces of a transparent substrate.

Another advantage of the present invention is to provide a dual-reflective LCD device capable of reducing fabrication costs by using one liquid crystal layer.

Still another advantage of the present invention is to provide a dual-reflective LCD device capable of being operated without an external light source.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device includes a first substrate having a first polarizer and a first retardation layer; a second substrate having a second polarizer and a second retardation layer; and a pixel between the first and second substrates, the pixel having a thin film transistor, a first reflective layer on the first substrate, a second reflective layer on the second substrate, a liquid crystal layer between the first and second substrates.

The LCD device further includes an auxiliary light source.

In another aspect of the present invention, a liquid crystal display device includes a first substrate having a first reflective layer; a second substrate having a second reflective layer; and a liquid crystal layer between the first and second substrates, wherein the light reflected by the first reflective layer of light incident on the first substrate is shielded, and the light reflected by the second reflective layer of light incident on the first substrate is used for displaying first information, wherein the light reflected by the second reflective layer of light incident on the second substrate is shielded, and the light reflected by the first reflective layer of light incident on the second substrate is used for displaying second information, and wherein the second information is substantially the same as the first information.

In still another aspect of the present invention, a display device having a display panel includes a first side of the display panel having a first reflective layer; and a second side of the display panel having a second reflective layer, wherein the first side of the display panel displays first information using the light reflected from the second reflective layer, and the second side of the display panel displays second information using the light reflected from the first reflective layer, wherein the first information is substantially the same as the second information.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to the embodiments of the present invention, examples of which are illustrated in the accompanying drawings.

Figure 1:
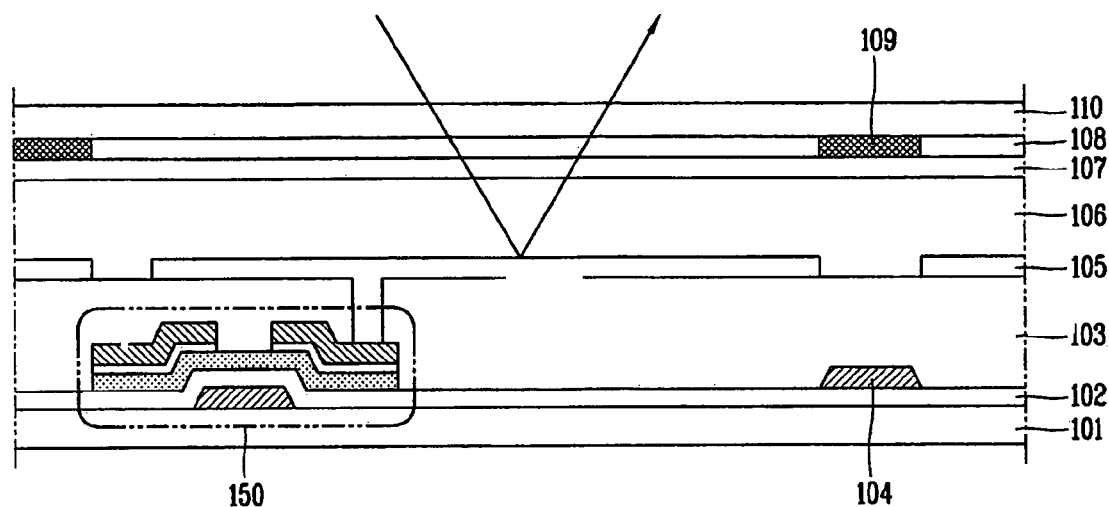
FIG. 1 is a sectional view illustrating a structure of a reflective LCD device according to a related art.
Figure 2:
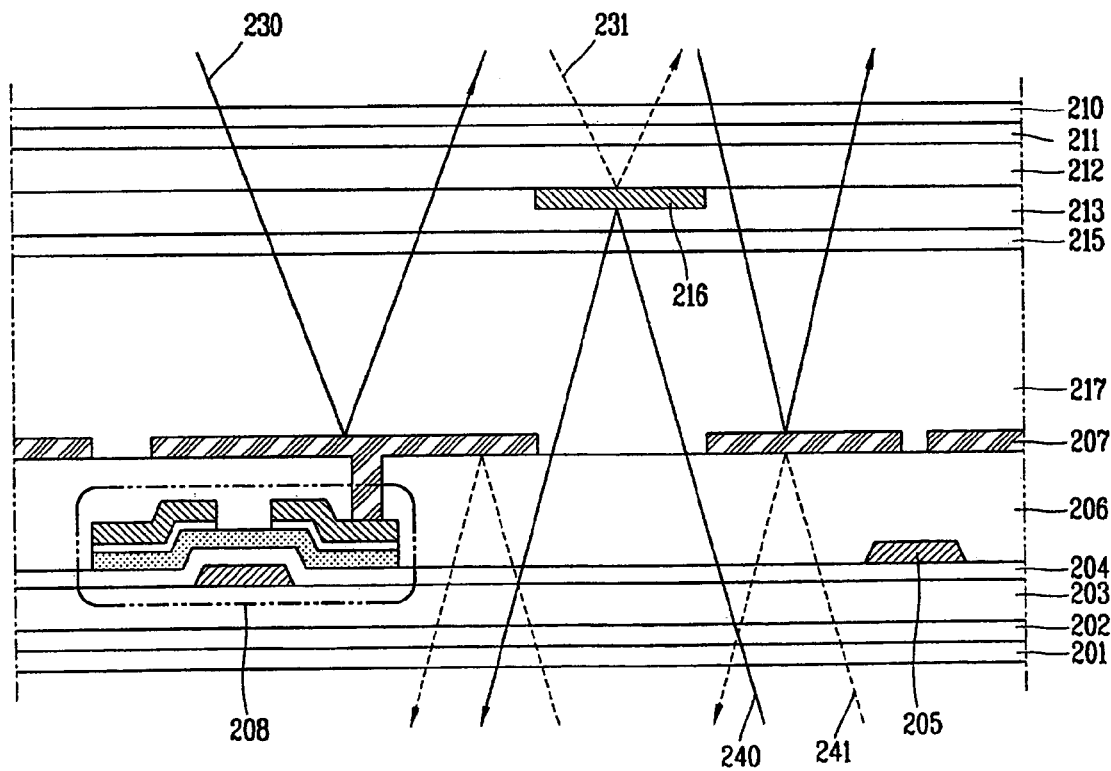
FIG. 2 is a sectional view illustrating a dual-reflective LCD device according to the first embodiment of the present invention.

Hereinafter, a structure of a dual-reflective liquid crystal display (LCD) device according to a first embodiment of the present invention will be explained with reference to FIGS. 2 and 3. FIG. 2 is a sectional view illustrating a dual-reflective LCD device according to the first embodiment of the present invention, and FIG. 3 is a plan view illustrating the dual reflective LCD device of FIG. 2.

Figure 3:
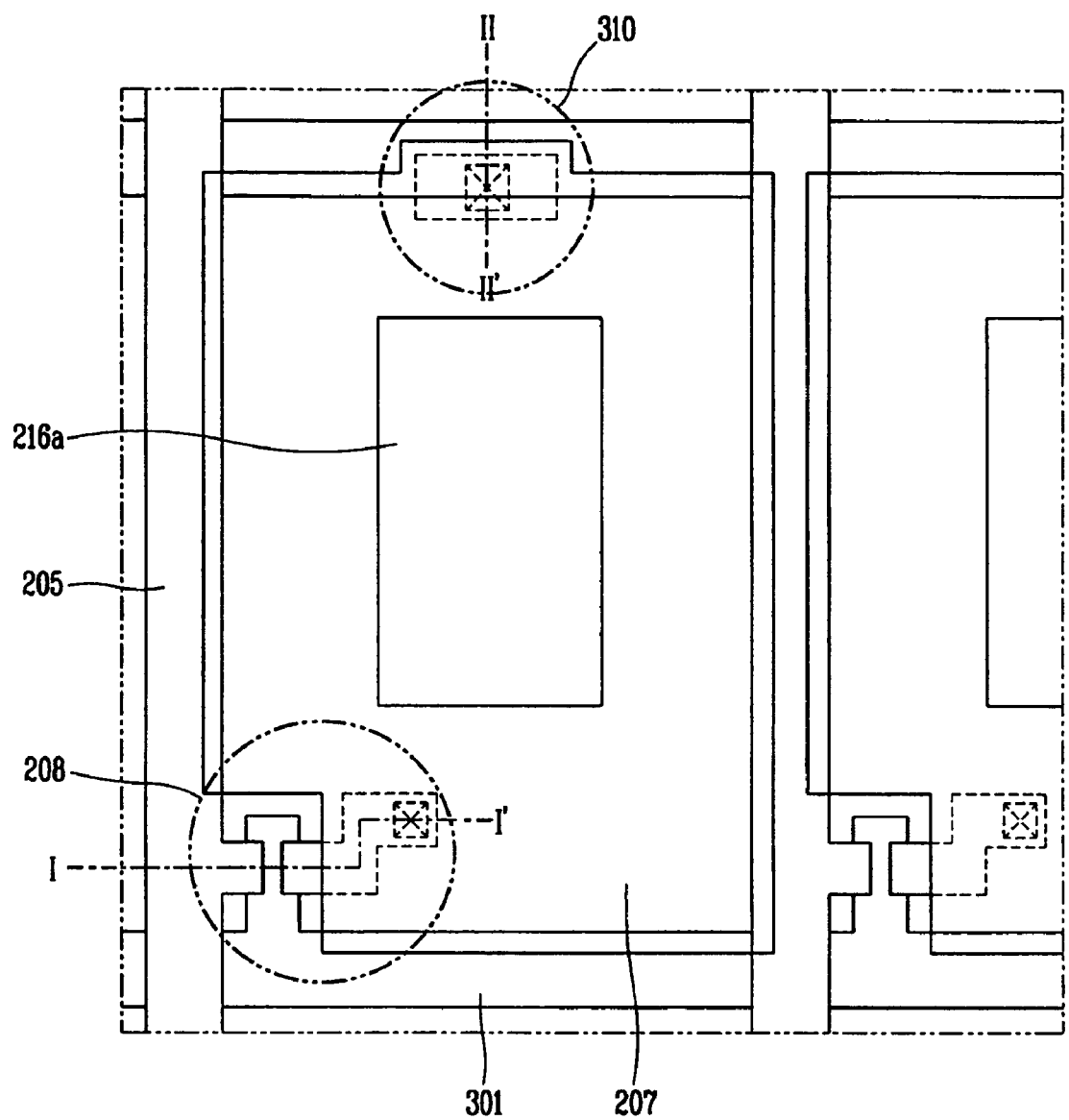
FIG. 3 is a plan view illustrating the dual reflective LCD device of FIG. 2.

Referring to FIGS. 2 and 3, a dual-reflective LCD device according to the first embodiment of the present invention includes a TFT (Thin Film Transistor) array substrate and a color filter substrate facing each other. A liquid crystal layer 217 is formed between the TFT array substrate and the color filter substrate.

The TFT array substrate includes a first transparent substrate 203 having a plurality of TFTs 208. A first polarizer 201 for polarizing incident light and a first retardation film 202 for phase-delaying light polarized by the first polarizer 201 are formed at an outer side of the first substrate 203. The first retardation film 202 is formed between the first transparent substrate 203 and the first polarizer 201. The TFTs 208 are arranged in a matrix configuration on the first substrate 203 as a switching device for switching unit pixels. A plurality of gate lines 301 and a plurality of data lines 205 crossing the gate lines are further formed on the first substrate 203. The TFTs 208 are formed near the crossing between the gate lines and the data lines, and a unit pixel region is defined by the gate lines 301 and the data lines 205.

The array substrate further includes a passivation layer 206 of an organic material or an inorganic material for protecting the TFTs, and a first reflection layer 207 for reflecting incident light formed on the passivation layer 206. Each unit pixel has the first reflection layer 207, which is connected to the TFT 208 through a contact hole in the passivation layer 206.

The first reflection layer 207 in a unit pixel has an opening portion 216a, as illustrated in FIG. 3. Through the opening portion 216a, light incident from a lower portion reaches the upper color filter layer. The opening portion 216a may be formed at a center region of the first reflection layer 207 with a predetermined size. Light reflected through the opening portion 216a enables a user to view images in one direction of the dual-reflective LCD device of the present invention. When determining the size of the opening portion 216a, the aperture ratio, brightness, and other characteristics of the dual-reflective LCD should be taken into consideration. The first reflection layer 207 may have a convex-concave shape to increase the reflectivity. The first reflection layer having a convex-concave shape can collect light in the user direction, and reflect light uniformly to all directions to achieve uniform picture quality.

Still referring to FIGS. 2 and 3, the color filter substrate includes a second transparent substrate 212, a second reflection layer 216, a second retardation film 211, a color filter layer 213, a common electrode 215 and a second polarizer 210. The second polarizer 210 polarizes light incident on an outer surface the second substrate 212, and the second retardation film 211 delays the phase of the polarized light. The second reflection layer 216 reflects light incident from a direction of the TFT array substrate, the color filter layer 213 is used for displaying color images, and the common electrode 215 of a transparent conductive material applies an electric field to the liquid crystal layer 217. The color filter layer 213 has sub-color filter layers of R, G, and B, and the three R, G and B sub-color filters constitute one unit pixel.

The second reflection layer 216 in a unit pixel is formed on the color filter substrate, corresponding to the opening portion 216a of the first reflection layer 207. That is, light passing through the opening portion 216a of the first reflection layer 207 is reflected by the second reflection layer 216, and is then emitted in a direction of the TFT array substrate. Therefore, the size of the second reflection layer 216 may be equal to or larger than the opening portion 216a.

Referring to FIG. 3, the TFT 208 is formed near the crossing between the gate line 301 and the data line 205. The first reflection layer 207 connected to the drain electrode of the TFT 208 is formed in the unit pixel region. The opening portion 216a is formed at a center region of the first reflection layer 207. Through the opening portion 216a, light incident from an outside of the TFT array substrate reaches the second reflection layer 216. The second reflection layer 216 is formed to correspond to the opening portion 216a of the first reflection layer 207, and the size of the second reflection layer 216 may be equal to or larger than the opening portion 216a.

Figure 4:
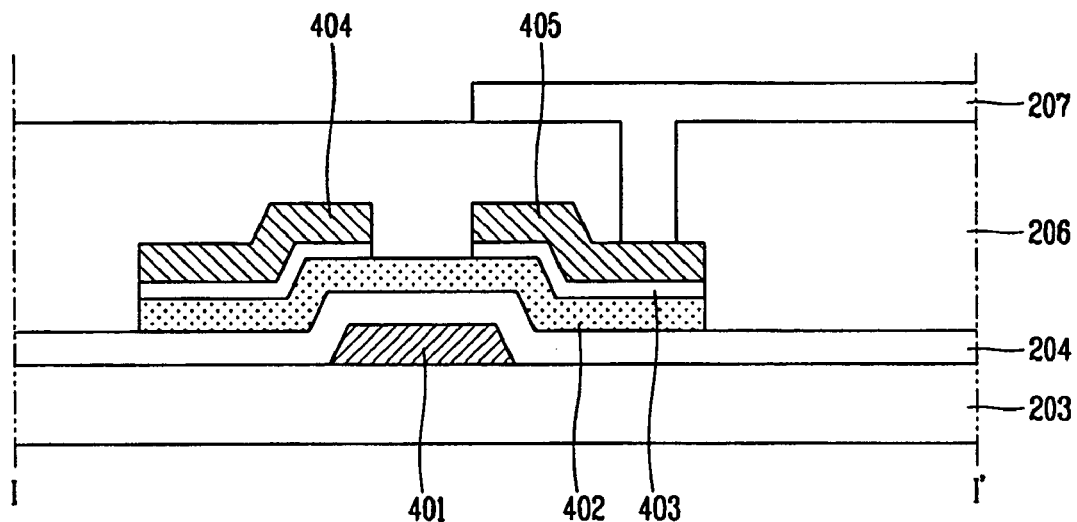
FIG. 4 is a sectional view taken along the line I-I' of FIG. 3, illustrating a structure of a TFT according to the present invention.

A structure of a TFT according to the present invention will be explained with reference to FIG. 4. FIG. 4 is a sectional view taken along the line I-I' of FIG. 3, illustrating a structure of a TFT according to the present invention.

The TFT of the LCD device according to the present invention includes a gate electrode 401 formed on the substrate 203, a gate insulating layer 204 formed on the substrate where the gate electrode 401 is formed, a semiconductor layer 402 formed on the gate insulating layer 204, a second semiconductor layer 403 formed on the semiconductor layer at a region except a channel layer and into which a high concentration impurity ion is injected, source and drain electrodes 404 and 405 ohmic-contacting the second semiconductor layer 403, the passivation layer 206 for protecting the device, and the first reflection layer 207 connected to the drain electrode 405. The source electrode is connected to the data line 205, and the TFT drives a pixel by gate and data signals.

Figure 5:
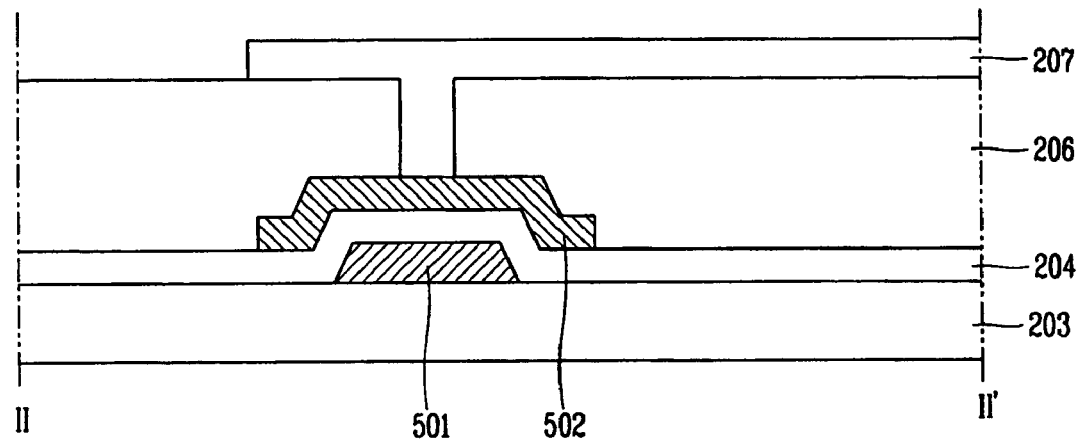
FIG. 5 is a sectional view taken along the line II-II' of FIG. 3, illustrating a structure of a storage capacitor according to the present invention.

A structure of a storage capacitor will be explained with reference to FIG. 5. FIG. 5 is a sectional view taken along the line II-II' of FIG. 3, illustrating a structure of a storage capacitor according to the present invention. FIG. 5 illustrates a storage on gate (SOG) type capacitor in which a capacitor structure is formed on a gate line.

A gate line 501 is formed on the substrate 203, and the gate insulating layer 204 is formed on the gate line. Also, a storage electrode 502 is formed on the gate insulating layer 204, over the gate line 501. The storage electrode 502 is connected to the first reflection layer 207 formed on the passivation layer 206, thereby forming a storage capacitor.

Figure 6A:
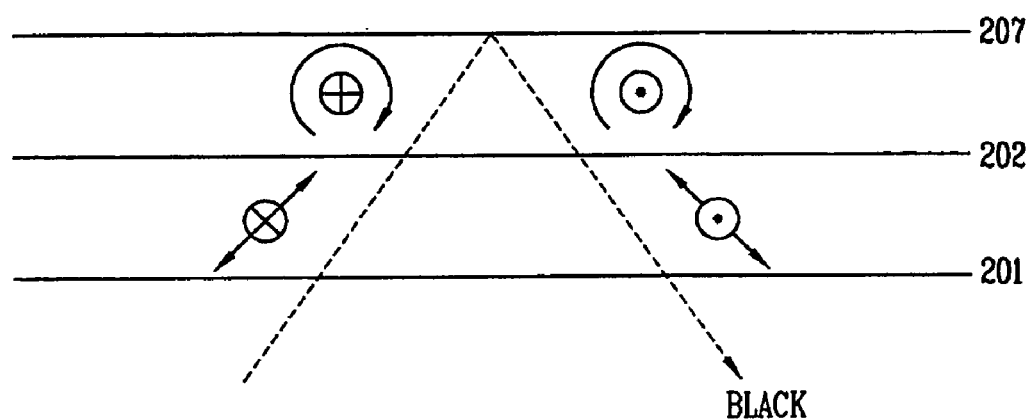
FIGS. 6A and 6B are schematic views illustrating an operating principle of a dual-reflective LCD device according to the present invention.
Figure 6B:
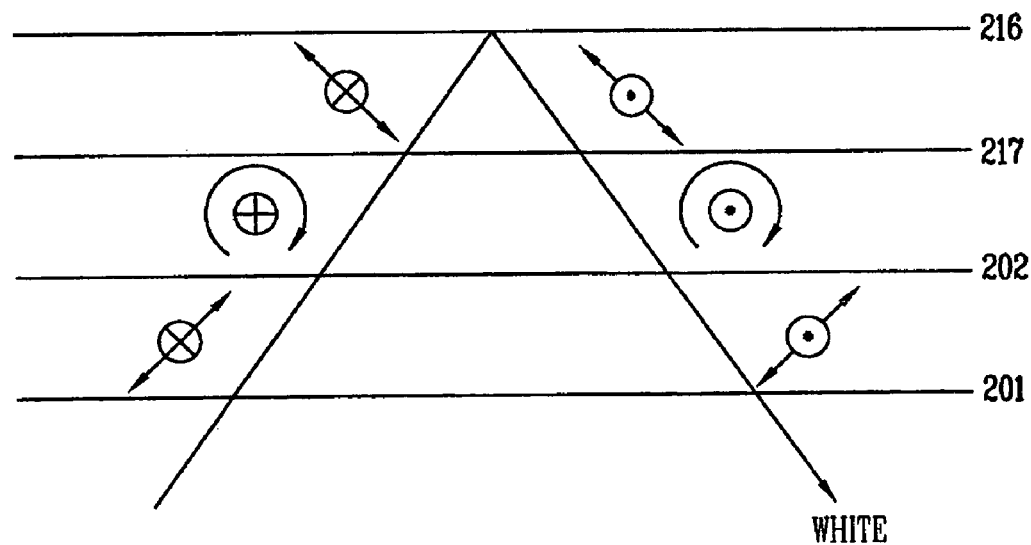

Hereinafter, an operational principle of the dual reflective LCD device of the present invention will be explained. FIGS. 6A and 6B are schematic views illustrating an operating principle of a dual-reflective LCD device according to the present invention.

First, an operational principle with respect to light incident on the array substrate will be explained with reference to FIGS. 6A and 6B. Some of the light incident on the array substrate is reflected by the first reflection layer 207 and thus is shielded by the first polarizer 201. Some of the light incident on the array substrate is reflected by the second reflection layer 216 and thus passes through the TFT array substrate.

Referring to FIG. 6A, among light incident on the array substrate, only a linearly-polarized light parallel to a polarization axis of the first polarization layer 201 passes through the first polarization layer 201. The linearly-polarized light is phase-delayed by the first retardation film 202 to become right circularly polarized light. Therefore, the first retardation film 202 may be a quarter wave plate for phase-delaying light by 90°. The right circularly polarized light is reflected by the first reflection layer 207, and thus is converted into left circularly polarized light. The left circularly polarized light passes through the first retardation film 202, and thus is converted into a linearly-polarized light perpendicular to the polarization axis of the first polarizer 201. Therefore, this linearly-polarized light is shielded by the first polarizer 201.

Referring to FIG. 6B, the light passing through the opening portion of the first reflection layer among the light incident on the TFT array substrate is right circularly polarized light, as explained above. The right circularly polarized light then passes through the liquid crystal layer 217 and thus becomes a linearly-polarized light perpendicular to the linearly-polarized light by the first polarizer 201. The linearly-polarized light is then reflected by the second reflection layer 216 and again passes through the liquid crystal layer 217, and thus becomes right circularly polarized light. The right circularly polarized light passes through the first retardation film 202 and thus becomes a linearly-polarized light parallel to the polarization axis of the first polarizer 201. Therefore, this linearly-polarized light passes through the first polarizer 201. That is, the right circularly polarized light becomes white.

In the above explanation, it is assumed that the polarized light passes through the liquid crystal layer in a direction perpendicular to the long axis of the liquid crystal molecules of the liquid crystal layer. Thus, gray levels can be obtained by applying different voltages between the two substrates to control the direction of the long axis of the liquid crystal molecules.

Next, light incident on the color filter substrate will be explained. Light incident on the color filter substrate is also reflected or shielded in accordance with the operational principle discussed with reference to FIGS. 6A and 6B.

That is, among light incident on the color filter substrate from outside, the light reflected by the second reflection layer 216 sequentially passes through the second polarizer 210, the second retardation film 211, the second reflection layer 216, the second retardation film 211, and the second polarizer 210 and thus is shielded (the dotted line 231 of FIG. 2). The second retardation film 211 may be a quarter wave plate.

Among light incident on the color filter substrate from outside, the light reflected by the first reflection layer 207 sequentially passes through the second polarizer 210, the second retardation film 211, the liquid crystal layer 217, the first reflection layer 207, the liquid crystal layer 217, the second retardation film 211, and the second polarizer 210 (the solid line 230 of FIG. 2). Thus, the light reflected by the first reflection layer 207 can pass through or is shielded by the color filter substrate, depending on the direction of the light when passing through the liquid crystal layer. That is, as explained with respect to the light incident on the TFT array substrate, when the polarized light passes through the liquid crystal layer in a direction perpendicular to the long axis of the liquid crystal molecules, the polarized light becomes white (the solid line 230).

Accordingly, the user can view the same information from both sides of the dual-reflective LCD device. However, according to the dual-reflective LCD device of the first embodiment, the user can view information from both directions only with external light. To solve such a problem, a dual-reflective LCD device according to a second embodiment of the present invention includes an auxiliary light source so that it can be used when there is no external light source.

A dual-reflective LCD device according to the second embodiment of the present invention is provided with a first auxiliary light source and a second auxiliary light source outside first and second polarizers. The TFT array substrate of the second embodiment has the same structure as that of the first embodiment. A structure of a dual-reflective LCD device according to the second embodiment of the present invention will be explained with reference to FIG. 7.

Figure 7:
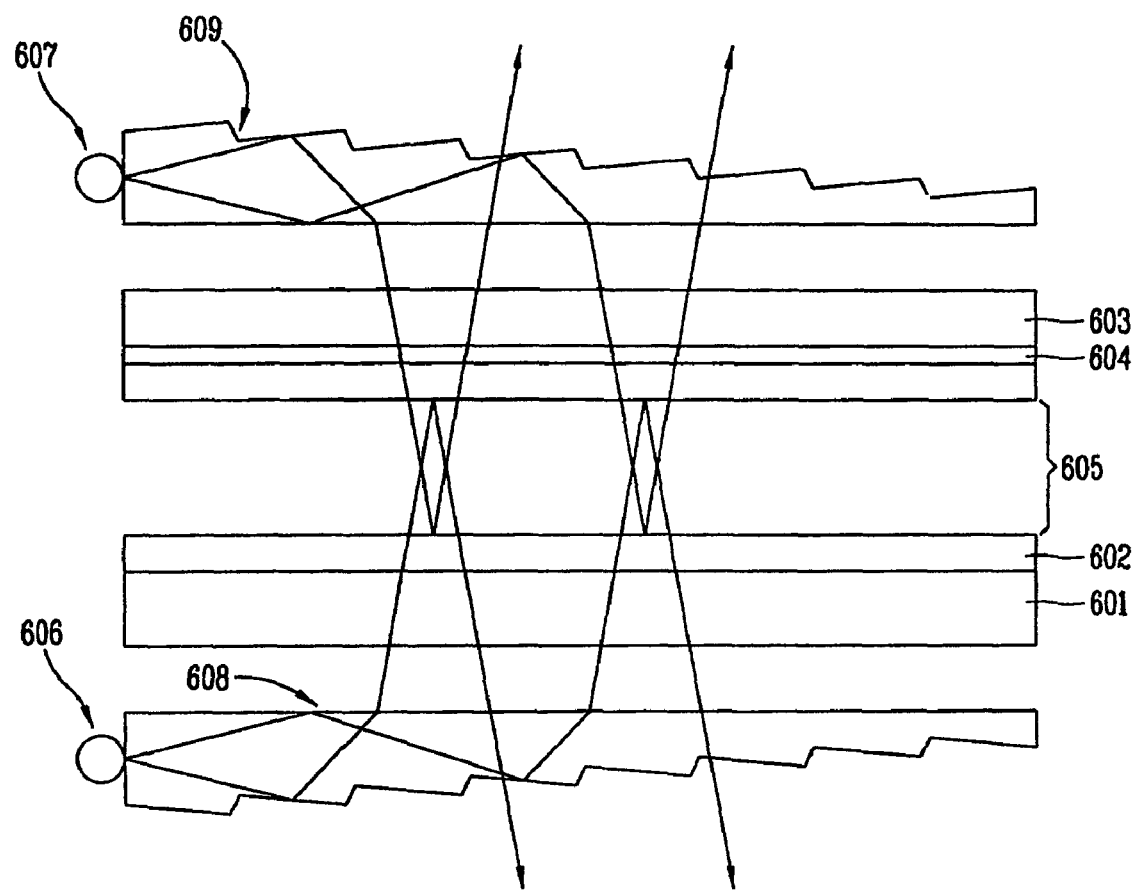
FIG. 7 is a schematic sectional view illustrating a dual-reflective LCD device according to the second embodiment of the present invention.

Referring to FIG. 7, an LCD device according to the second embodiment of the present invention includes a TFT array substrate 601 having a first reflection layer 602, a color filter substrate 603 having a second reflection layer 604, a first auxiliary light source 606 formed at a lateral surface of the TFT array substrate, a first light guide layer 608 for reflecting the light generated from the first auxiliary light source 606 to a liquid crystal layer 605, a second auxiliary light source 607 formed at a lateral surface of the color filter substrate 603, and a second light guide layer 609 for reflecting the light generated from the second auxiliary light source 607 to the liquid crystal layer 605. The TFT array substrate and the color filter substrate have the same constructions as those of the first embodiment of the present invention. The first auxiliary light source 606 and the second auxiliary light source 607 may generate white light close to natural light.

The first and second auxiliary light sources can be installed at lateral surfaces of the TFT array substrate and the color filter substrate. Each auxiliary light source is connected to an inverter (not shown) for supplying power to the light source, and is further provided with a switch (not shown) for selectively turning on/off the light source. The first light guide layer 608 is installed at an inner surface of the TFT array substrate in order to introduce the light generated from the first auxiliary light source 606 into the liquid crystal layer 605, and the second light guide layer 609 is installed at an inner surface of the color filter substrate to introduce the light generated from the second auxiliary light source 607 into the liquid crystal layer 605.

The first light guide layer 608 and the second light guide layer 609 can be provided with a step on one surface thereof to increase reflectivity of the light introduced from the light source. Another surface of the first light guide layer 608 and the second light guide layer 609 may have a flat surface.

According to the present invention, the LCD device may turn off the auxiliary light sources when there is external light, and turn on the auxiliary light sources when there is no or insufficient external light. Accordingly, the LCD device can be effectively used regardless of external light conditions.

As aforementioned, with the dual-reflective LCD device according to the present invention, the user can view the same image or information from both sides of the liquid crystal panel. Also, because an auxiliary light source is provided, the LCD device can be effectively used regardless of external light conditions. Additionally, because the dual-reflective LCD device has only one liquid crystal panel, the fabrication cost can be reduced.

It will be apparent to those skilled in the art that various modifications and variations can be made in the above-discussed display device and the driving method thereof without departing from the spirit or scope of the invention. Thus, it is intended that the present invention cover the modifications and variations of this invention provided they come within the scope of the appended claims and their equivalents.

What is claimed is:

1. A dual reflective liquid crystal display device comprising:
    a first substrate having a first polarizer and a first retardation layer, wherein the first polarizer and the first retardation layer are formed at an outer surface of the first substrate;
    a first light guide layer at an outer side of the first substrate, wherein the first light guide layer is provided with a step at one surface thereof;
    a first auxiliary light source formed at a lateral surface of the first substrate;
    a second substrate having a second polarizer and a second retardation layer, wherein the second polarizer and the second retardation layer are formed at an outer surface of the second substrate;
    a second light guide layer at an outer side of the second substrate, wherein the second light guide layer is provided with a step at one surface thereof;
    a second auxiliary light source formed at a lateral surface of the second substrate; and
    a pixel between the first and second substrates, the pixel having a thin film transistor, a first reflective layer on the first substrate, a second reflective layer on the second substrate, and the second retardation layer are formed at an outer surface of the second substrate, a liquid crystal layer between the first and second substrates,
    wherein the first reflection layer has an opening portion and a convex-concave shape to increase a reflection efficiency, and the second reflection layer corresponds to the opening portion of the first reflection layer, and the size of the second reflection layer is equal to or larger than the opening portion, wherein the second reflection layer is formed at an inner surface of the second substrate;
    wherein first light incident through the opening portion of the first reflective layer on the first substrate is reflected by the second reflective layer, to pass through the first substrate; and second light incident through the second substrate is reflected by the first reflective layer, to pass through the second substrate, and wherein the first and second auxiliary light sources are turned off when there is external light, and the first and second auxiliary light sources are turned on when there is no external light so that an user views image or information from both sides of the liquid crystal display device,
    and wherein the light provided from the first auxiliary light source incident through the first light guide layer is reflected by the second reflective layer so that a first image is viewed through the first light guide layer at an outer side of the first substrate, and the light provided from the second auxiliary light source incident through the second light guide layer is reflected by the first reflective layer so that a second image is viewed through the second light guide layer at an outer side of the second substrate, and the first image is the same image as the second image.

2. The device of claim 1, wherein the first and second retardation layers delay the phase of light by about 90°.

3. The device of claim 1, wherein the second substrate further includes a common electrode.

4. The device of claim 1, wherein incident light on the first substrate reflected by the first reflective layer is shielded by the first polarizer.

5. A dual reflective liquid crystal display device comprising:
    a first substrate having a first reflective layer, wherein the first reflection layer has an opening portion and a convex-concave shape to increase a reflection efficiency;
    a first light guide layer at an outer side of the first substrate, wherein the first light guide layer is provided with a step at one surface thereof;
    a first auxiliary light source formed at a lateral surface of the first substrate;
    a second substrate having a second reflective layer and a color filter layer thereon, the color filter disposed over the second reflective layer, wherein the second reflection layer corresponds to the opening portion of the first reflection layer, and the size of the second reflection layer is equal to or larger than the opening portion, wherein the first and second substrates include first and second retardation films, respectively, and wherein the retardation films include a quarter wave plate;
    a second light guide layer at an outer side of the second substrate, wherein the second light guide layer is provided with a step at one surface thereof;
    a second auxiliary light source formed at a lateral surface of the second substrate; and
    a liquid crystal layer between the first and second substrates,
    wherein light reflected by the first reflective layer of first light incident on the first substrate is shielded, and light reflected by the second reflective layer of the first light incident on the first substrate is used for displaying first information,
    wherein light reflected by the second reflective layer of second light incident on the second substrate is shielded, and light reflected by the first reflective layer of the second light incident on the second substrate is used for displaying second information, and wherein the second information is substantially the same as the first information, and wherein the first and second auxiliary light sources are turned off when there is external light, and the first and second auxiliary light sources are turned on when there is no external light so that an user views image or information from both sides of the liquid crystal display device, and wherein the light provided from the first auxiliary light source incident through the first light guide layer is reflected by the second reflective layer so that a first image is viewed through the first light guide layer at an outer side of the first substrate, and the light provided from the second auxiliary light source incident through the second light guide layer is reflected by the first reflective layer so that a second image is viewed through the second light guide layer at an outer side of the second substrate, and the first image is the same image as the second image.

6. A dual reflective liquid crystal display device having a display panel comprising:
- a first side of a transistor array substrate of a display panel having a first reflective layer, wherein the first reflection layer has an opening portion and a convex-concave shape to increase a reflection efficiency; and
- a first light guide layer at an outer side of the transistor array substrate, wherein the first light guide layer is provided with a step at one surface thereof;
- a first auxiliary light source formed at a lateral surface of the transistor array substrate;
- a second side of a color filter array substrate of the display panel having a second reflective layer and a color filter layer thereon, the color filter layer disposed over the second reflective layer,
- a second light guide layer at an outer side of the color filter array substrate, wherein the second light guide layer is provided with a step at one surface thereof;
- a second auxiliary light source formed at a lateral surface of the color filter array substrate;
- wherein the second reflection layer corresponds to the opening portion of the first reflection layer, and the size of the second reflection layer is equal to or larger than the opening portion,
- wherein the first side of the transistor array substrate of the display panel displays first information using first light reflected from the second reflective layer, and the second side of the color filter array substrate of the display panel displays second information using second light reflected from the first reflective layer, wherein the first light is incident through the transistor array substrate, and the second light is incident through the color filter array substrate; and wherein the first information is substantially the same as the second information, and wherein the first and second auxiliary light sources are turned off when there is external light, and the first and second auxiliary light sources are turned on when there is no external light so that an user views image or information from both sides of the display panel,
- and wherein the light provided from the first auxiliary light source incident through the first light guide layer is reflected by the second reflective layer so that a first image is viewed through the first light guide layer at an outer side of the first substrate, and the light provided from the second auxiliary light source incident through the second light guide layer is reflected by the first reflective layer so that a second image is viewed through the second light guide layer at an outer side of the second substrate, and the first image is the same image as the second image.

7. The device of claim 6, wherein the first and second sides of the display panel further include first and second retardation layers, respectively.

8. A dual reflective liquid crystal display device having a display panel comprising:
- a transistor array substrate having a first reflective plate;
- a color filter substrate having a second reflection plate and a color filter layer thereon, the color filter layer disposed over the second reflective plate;
- a first auxiliary light source formed at a lateral surface of the transistor array substrate;
- a first light guide plate for reflecting light generated from the first auxiliary
- light source to a liquid crystal layer, wherein the first light guide plate is provided with a step at one surface thereof to completely reflect light introduce from the first auxiliary light source to the liquid crystal layer;
- a second auxiliary light source formed at a lateral surface of the color filter substrate; and
- a second light guide plate for reflecting light generated from the second
- auxiliary light source to the liquid crystal layer, wherein the second light guide plate is provided with a step at one surface thereof to completely reflect light introduce from the second auxiliary light source to the liquid crystal layer,
- wherein light introduced from the first auxiliary light source is reflected by the second reflection plate, and light introduced from the second auxiliary light source is reflected by the first reflection plate, and wherein the first and second auxiliary light sources are turned off when there is external light, and the first and second auxiliary light sources are turned on when there is no external light so that an user views image or information from both sides of the liquid crystal display device,
- and wherein the light provided from the first auxiliary light source incident through the first light guide layer is reflected by the second reflective layer so that a first image is viewed through the first light guide layer at an outer side of the first substrate, and the light provided from the second auxiliary light source incident through the second light guide layer is reflected by the first reflective layer so that a second image is viewed through the second light guide layer at an outer side of the second substrate, and the first image is the same image as the second image.

* * * * *